United States Patent

Knobloch et al.

[11] Patent Number: 5,926,282
[45] Date of Patent: Jul. 20, 1999

[54] MULTISPECTRAL SENSOR DEVICE

[75] Inventors: Jens Knobloch; Norbert Haase; Andreas Kalz, all of Dresden, Germany

[73] Assignee: Fraunhofer-Gesellschaft zur Forderung der Angewandten Forschung E.V., Munich, Germany

[21] Appl. No.: 08/875,970

[22] PCT Filed: Sep. 27, 1995

[86] PCT No.: PCT/EP95/03824

§ 371 Date: Aug. 7, 1997

§ 102(e) Date: Aug. 7, 1997

[87] PCT Pub. No.: WO97/12212

PCT Pub. Date: Apr. 3, 1997

[51] Int. Cl.[6] .................................. G01J 3/51; G01N 21/88
[52] U.S. Cl. ........................ 356/419; 356/425; 364/526; 250/226
[58] Field of Search ............................ 250/214.1, 214 L, 250/214 R, 226; 364/526; 356/402, 416, 419, 425

[56] References Cited

U.S. PATENT DOCUMENTS 4,653,014 3/1987 Mikami et al. ........................... 356/406
4,653,925 3/1987 Thornton, Jr. ............................ 356/419
5,218,555 6/1993 Komai et al. .
5,526,119 6/1996 Bilt et al. ................................. 356/402

FOREIGN PATENT DOCUMENTS

0081702 A1 6/1983 European Pat. Off. .
3622043 A1 1/1988 Germany .
3933461 A1 4/1990 Germany .

*Primary Examiner*—Robert H. Kim
*Assistant Examiner*—Zandra V. Smith
*Attorney, Agent, or Firm*—Wolf, Greenfield & Sacks, PC

[57] ABSTRACT

A multispectral sensor device comprises a plurality of optoelectrical converters. Each optoelectrical converter generates wavelength selectively from an optical signal an electrical measurement signal in a respective measurement channel. A processing circuit processes the generated electrical measurement signals to the respective measurement signal values. A fuzzy logic circuit performs a comparison of the generated measurement signal values with reference values and, on the basis of the comparison, assigns the measurement signal values to a number of channels, this number exceeding the number of measurement channels.

8 Claims, 1 Drawing Sheet

MULTISPECTRAL SENSOR DEVICE

BACKGROUND OF THE INVENTION

The present invention relates to a multispectral sensor device for analysing optical radiation with unknown spectral composition and intensity distribution predominantly from the ultraviolet region (UV) through the visible region (VIS) up to the near infrared region (NIR).

DESCRIPTION OF THE PRIOR ART

Such a sensor can be employed as a colour recognition system with the prescribed three spectral components red, green and blue in the VIS region, as an extended colour recognition system with the additional spectral components as colour equivalents, or, on increasing the number of channels and thus reducing the spectral bandwidth, also as a channel spectrometer.

In the field of technology, various colour measurement systems or spectral analysers are known.

DE 36 22 043 A1 describes a device for colour measurement. This device requires at least two prescribed spectral sensitivity functions and a number of illuminated filters for spectral filtering, a detector arrangement with a detector behind each filter and an evaluation circuit which receives the detector signals delivered by the detectors and delivers the measurement value signals assigned to the individual sensitivity functions. In a data store of the evaluation circuit a plurality of weighting factors, each of which is assigned to one of the individual sensitivity curves, are stored. The evaluation circuit derives the measurement value signals, each of which is assigned to one of the individual sensitivity curves, from the detector signals of these detectors, these signals being weighted with the weighting factors assigned to the respective sensitivity functions. Only a crude colour determination can be achieved with this arrangement. For spectral analyses with 10 nm resolution per measurement channel, for example, in the visible region (380 nm to 700 nm) 40 channels would be needed, to realize which would require a big outlay with this arrangement.

In DE 41 43 284 A1 an integrated semiconductor sensor for spectrometers is described. This sensor comprises a plurality of radiation detectors, charge storage and charge transport units, supply potential lines, logic circuits and output amplifiers. These units are arranged in a one- or two-dimensional arrangement so as to convert the radiation from subregions of the spectrum into electrical signals. The radiation detectors, which are assigned to one, or several connected, wavelength regions of the spectrum imaged on the integrated semiconductor sensor, all have dimensions matched to the local resolving conditions, which result from the diaphragm and dispersion systems of the spectrometer and the radiation source under investigation, and are arranged in accordance with the line structure of the spectrum. The storage—charge transport—amplifier and circuit units, which are circuited behind the detectors, are equipped in a way which is specific to the sensors being used. By means of such an arrangement together with an integrated logic circuit, the signals of the detectors of selectably connected sections of at least one wavelength region which is covered regularly with detectors are combined singly or partially and are read out serially and/or in parallel. In addition, the light integration time of the individual sections is controlled.

This sensor can also be used as a colour sensor. Its disadvantage, however, lies in the fact that each subregion of the spectrum requires an appropriately matched detector in the measurement channel. This means that either the spectral region to be detected is restricted or that a large number of such detectors must be realized in order to detect the whole spectral region to be detected. For many measurement problems this is not possible, however, since the measurement beam of the incident light must be optically broadened in such a way that all the spectrally matched detectors are illuminated uniformly. As a result, the semiconductor sensor itself becomes large and the light intensity at the individual detectors decreases.

DE 41 33 481 A1 describes another multispectral sensor. In this the measurement beam is decomposed into several sub-beams by means of an optical unit and is reflected onto filters. Behind the filters, there is an arrangement of radiation-sensitive elements which detect the spectral region corresponding to the transmission region of the respective pre-circuited filter. The remaining spectral region of the sub-beam is reflected from the filter surface onto the other filters. Such an arrangement is only sensible for a small number of spectral regions, since otherwise this sensor too requires a large and complicated optical structure.

Another colour sensor is disclosed in the publication "Sensor and Actuators A" 41–42 (1194), pp. 123–128. For the determination of the red, green and blue components of the radiation in the visible spectral region, vertically stacked silicon diodes are used, by means of which the wavelength-dependent absorption of the visible light in silicon is exploited to set the required spectral regions. This solution is an elegant one for the determination of the colour components of a spectrum, since the dimensions of such a sensor can be kept small. However, the spectral bandwidth of the three spectral regions and also their main position are only limitedly selectable on account of the technologically determined depth of the detection volumes of the p-n junctions. As a result, the sensor cannot be used as a multispectral sensor.

The known multispectral sensors for the UV-VIS-NIR spectral regions have the disadvantage that for each measurement channel they require a detector and/or, for the spectral decomposition, additional optical paths and components, such as lattices or prisms e.g., which are partially also movably arranged; this means that they are correspondingly large and complex to manufacture.

From U.S. Pat. No. 5,218,555 a method for judging the colour difference between the colour of an object and a reference colour is already known, in which the colour of an object is detected with a colour camera, which is connected to a computer which converts the signal delivered by the camera into colour signal values for quantitative representation of the colour. These colour values are combined via a fuzzy logic with reference values with the aid of association functions so as to ascertain colour deviations of the object colour from a reference colour.

SUMMARY OF THE INVENTION

It is a major object of the present invention to provide a multispectral sensor device which, by detecting a small number of spectral subregions with relatively large spectral bandwidth enables statements to be made about a larger number of spectral subregions with smaller bandwidth.

This object is achieved by a multispectral sensor device comprising:
  a plurality of optoelectrical converters for the recording of spectral regions and for generating a separate electrical measurement signal for each spectral region;
  a processing circuit, in which the electrical measurement signals are each processed to measurement values; and a fuzzy logic circuit which, by means of stored association functions, forms from the measurement values output signals from output channels, where to each of the output channels there corresponds a spectral region with a bandwidth which is low compared with the bandwidth of the spectral regions detected by the optoelectrical converter and where the number of output channels exceeds the number of optoelectrical converters.

The optoelectronic converters employed in the present invention are preferably photodiodes, which are each provided with multilayer filters which are spectrally different from one another. The processing circuit preferentially exhibits measurement amplifiers, analog/digital converters and measurement value accumulators in order to convert the measurement signals into measurement signal values. The measurement signal values are then supplied to the fuzzy logic circuit via a reference value store in which the reference values are stored.

Such a sensor can, together with analog and digital signal processing components, be integrated as a microsystem on a chip in minute monolithic form and can therefore be produced cheaply in great numbers. Furthermore, it is possible to fulfil very stringent system requirements, in particular because of the fuzzy logic circuit of the detector system. In addition, an extreme miniaturisation is achieved compared with previous spectrometer systems, since the number of necessary detector channels is reduced to a minimum while the need for optical paths for the spectral decomposition of the light and for movable parts, such as lattices or prisms, and movable detectors is eliminated.

The fuzzy classification of the measurement signal values makes it possible to achieve a sufficiently secure evaluation even for not exactly defined (fuzzy) background conditions, such as the illumination and the associated evaluation of the measurement quality, or for disturbed signals. The unfavourable properties of cheap integrated sensors as against expensive individual sensors, which are attributable to unavoidable tolerances in the common manufacture of all the photodiodes and multilayer filters and the lack of an individual optimization of each sensor component, are compensated for by appropriate design of the fuzzy logic circuit.

According to the present invention a multispectral sensor device with e.g. n channels for the UV-VIS-NIR region is provided, that, by detecting only a small number of spectral subregions with relatively large spectral bandwidth, creates by means of an integrated fuzzy logic a multiplicity of spectral subregions of much smaller bandwidth. These are assigned to discrete channels, so that this sensor device can be used both for the determination of the colour components or colour equivalents and for discrete spectral analysis with the channel width as the discretive entity, where the discretive entity correponds to the spectral resolution of the multispectral sensor device. With such a multispectral sensor device it is possible e.g. to make statements regarding the classification of the deviation with respect to a given colour, the occurrence of defined spectral components or the colour of the measurement object.

Such a sensor is versatile in its application, especially since, as a monolithically integrated component e.g in Si-CMOS technology, it can be produced economically and in large numbers on a chip together with analog and digital signal processing units.

BRIEF DESCRIPTION OF THE DRAWINGS

Preferred embodiments of the present invention will be described hereinbelow making reference to the drawings enclosed, in which.

DESCRIPTION OF THE PREFERRED EMBODIMENT

Figure 1:
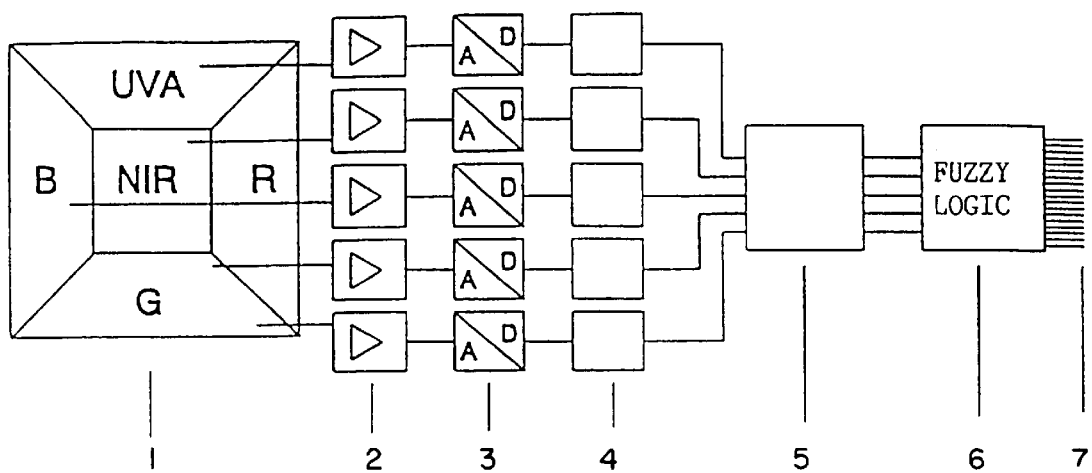
FIG. 1 shows an embodiment of the multispectral sensor device according to the present invention.

As is shown in FIG. 1, a preferred embodiment of the present invention comprises five photodiodes 1 (UVA, B, G, R, NIR). These photodiodes are deposited on a silicon substrate and each is provided with a multilayer filter of the desired bandwidth and middle wavelength and conforming to the technology. The multilayer filter or filter layer system is deposited on the photoactive region of the diode, which is in a thin semiconductor layer, there being an isolating intermediate layer between this semiconductor layer and the Si substrate.

Each of the diodes is connected to a measurement amplifier 2. Each measurement amplifier in its turn is connected to an analog/digital converter 3. The analog/digital converters are connected to accumulators 4, the outputs of which are connected to a measurement and reference value store 5. The outputs of the measurement and reference value store 5 are connected to a fuzzy logic unit 6. If required, a temperature compensation can also be provided for this circuit.

If radiation of arbitrary spectral composition and intensity distribution now falls on the multispectral sensor, it is detected by the five photodiodes of the sensor simultaneously but according to their spectrally different sensitivities. The detected measurement signals are fed to the individually assigned measurement amplifiers, the output signals of which are converted into digital signals by analog/digital converters and, after a digital characteristic correction, are added on in an accumulator. The measurement signal values thus obtained are then fed to the fuzzy logic circuit via the measurement and reference value store 5. Among other things, the object of the fuzzy logic circuit here is to form with a higher resolution, from the signals of only a few photosensors (in the present example 5), the spectral components of the light being measured and to effect a classification. Various fuzzy systems are provided for different applications. Firstly, the comparison with a prescribed colour, i.e. a classification of the deviation relative to the prescribed colour, secondly, a spectral analysis, i.e. a fuzzy statement concerning the occurrence of defined spectral components, and, thirdly, a colour classification, i.e. a fuzzy statement concerning the colour of the measurement object. Furthermore, by means of the fuzzy logic circuit 6 it is possible to perform recognition of an object and a classification of the same.

Figure 2:
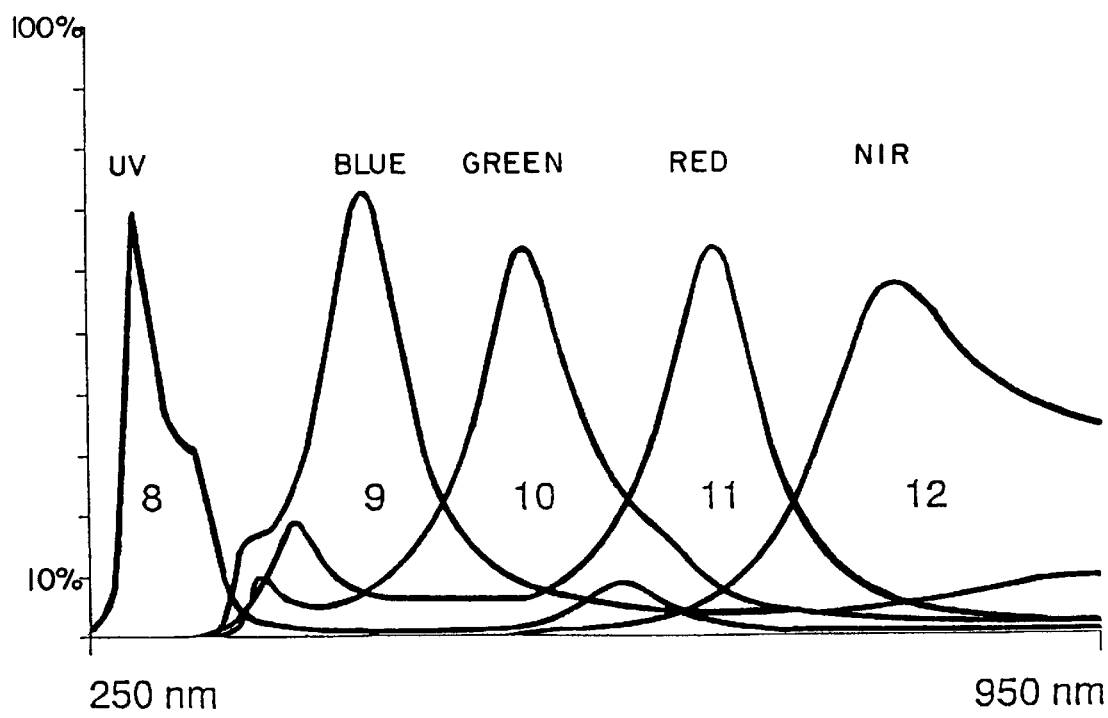
FIG. 2 shows the behaviour of the spectral sensitivity of the photodiodes described in the embodiment.

FIG. 2 shows the behaviour of the spectral sensitivity of the 5 diodes employed in the preferred embodiment. In this embodiment the multilayer filters of the 5 diodes are dimensioned for the spectral region UV-VIS-NIR (220 nm to 950 nm). In the following the dimensioning of the five multilayer filters or the filter layer systems for the individual diodes is described.

1st diode (UVA):

The filter layer system of the 1st diode is formed in the photoactive region of the diode by the successive deposition of $SiO_2$ with a thickness of 320 nm to 340 nm, Al with a thickness of 10 nm to 15 nm, $SiO_2$ with a thickness of 180 nm, Al with a thickness of 10 nm to 15 nm and finally $SiO_2$ with a thickness of 80 nm to 90 nm. The filter dimensioned in this way has a maximum transmission 8 at a wavelength of about 290 nm with a half-value width of approx. 55 nm and has a maximum transmission of approx. 65%.

2nd diode (VIS blue):

The filter layer system of the 2nd diode is formed in the photoactive region of the diode by the successive deposition of $TiO_2$ with a thickness of 50 nm, $SiO_2$ with a thickness of 125 nm and finally Al with a thickness of 10 to 15 nm. The filter dimensioned in this way has a maximum transmission 9 at a wavelength of approx. 440 nm with a half-value width of approx. 75 nm. The maximum transmission 9 is approx. 70%.

3rd diode (VIS green):

The filter layer system of the 3rd diode is formed in the photoactive region of the diode by the successive deposition of $TiO_2$ with a thickness of 50 nm, $SiO_2$ with a thickness of 160 nm and Au with a thickness of 30 nm to 35 nm. This filter has a maximum transmission 10 at a wavelength of about 550 nm with a half-value width of 130 nm. The maximum transmission 10 is approx. 65%.

4th diode (VIS red):

The filter layer system of the 4th diode is formed in the photoactive region of the diode by the successive deposition of $TiO_2$ with a thickness of 50 nm, $SiO_2$ with a thickness of 220 nm and Au with a thickness of 30 nm to 35 nm. The maximum transmission 11 at a wavelength of about 680 nm has a half-value width of approx. 115 nm and a maximum value of approx. 60%.

5th diode (NIR):

The filter layer system of the 5th diode is formed in the photoactive region of the diode by the successive deposition of $TiO_2$ with a thickness of 50 nm, $SiO_2$ with a thickness of 560 nm to 580 nm and polycrystalline silicon with a thickness of 1.5 $\mu$m to 2.1 $\mu$m. The maximum transmission 12 of this filter at approx. 810 nm has a half-value width of approx. 240 nm. The maximum transmission is approx. 55%.

Alternatively, other spectral regions can be detected by employing optoelectric converters, which are provided with an appropriately matched spectral sensitivity.

In the following the fuzzy logic circuit of the present invention will be described in more detail.

The fuzzy logic circuit extracts characteristics from the measurement signal values and adds extra application-specific characteristics. By means of the association functions stored in the fuzzy system and fuzzy rules, superposition of all the characteristics is achieved with the aim of optimal classification. The signal measurement values of the e.g. five photodiodes are assigned to e.g. n spectral channels with an association between 0 and 1. In this way a high discrete spectral resolution is achieved with only a few photodiodes of different spectral sensitivity. Appropriate algorithms and storage methods render the fuzzy system adaptive, i.e. it can be optimized and adapted to changing conditions.

A fuzzy logic which can be used in the fuzzy logic circuit of the preferred embodiment will now be described.

For the construction of the colour classifier with fuzzy logic it is not necessary to describe mathematically the transmission behaviour of the system nor to determine the statistical distribution functions. To start with, the measurement signal values detected through measurement series by means of the photodiodes will be considered. These measurement signal values are compressed and processed to diagnosis characteristics, which together form the characteristic vector for the system being considered. The "fuzziness" of the manufacture and of the measurement are here taken into account.

As is shown in FIG. 2, the characteristic vector, in the present example, consists of the five values "UV", "blue", "green", "red" and "NIR", which can be supplemented or also reduced in specific applications. The signal value of each characteristic is assigned to value ranges, e.g. "near zero (nz)", "small (s)", "medium (m)", "medium large (ml)", "large (l)" and "very large (vl)", the boundaries between which are indistinct. For the assignment to a signal value, appropriate experimental values are used, this assignment forming the association function of the corresponding characteristic.

For the desired classes (e.g. 8 special colours) a connection, defined by verbal fuzzy rules, is formed to the characteristic vector. For example, if, corresponding to FIG. 2, a class "blue-green" is to be formed, a possible rule is:

IF

"UV"="nz" and "blue"="ml" and "green"="l" and "red"="s" and "NIR"="nz"

THEN

"blue-green"

Additional rules for this class would result in an improvement in the precision of the statement. The characteristic vector, the corresponding association functions and the complete set of fuzzy rules are the basis of the classifier.

When n classes exist, the classifier forms an n-dimensional characteristic space, in which each class corresponds to a subregion. The task of this fuzzy classifier is now to assign an object, in this case a colour, to a class even when this signal is disturbed by additional information, e.g. a varying light intensity, a gloss or the surface structure. Since the individual classes are hazily described, the result obtained is not a precise value but a certain degree of association with a class. This degree of association, also called sympathy, can assume values between 0 and 1. For example, if the above rule is fully satisfied, the degree of association or the sympathy for the class "blue-green" has the value 1. A reduced light intensity or results of further rules for the class "blue-green" can, of course, reduce this value.

Using this method it is possible, with suitable optimization of the classifier, to define colour stages between the measured colour values and to interpret transitions. For the classification decision on the basis of the evaluation of the sympathy values of each class, three cases must be distinguished:

1. The sympathy value of a class is significantly larger than all other sympathy values: the object is assigned unambiguously to a class.
2. The sympathy value of a class is only insignificantly larger than another sympathy value: the classification decision can only be accepted with reservation, there may be a tendency to a neighbouring class.
3. All sympathy values are smaller than a prescribed identification threshold: the object cannot be assigned to any class.

With the fuzzy evaluation of a few sensor signals which has been chosen according to the preferred embodiment, an increase in the number of colour classes is possible. Through the specification of necessary sympathy values and identification thresholds a high statement accuracy is possible even for fuzzy ambient conditions.

The named properties of the multispectral sensor device with fuzzy logic of the present invention enable it to be used for all tasks relating to a real or false colour analysis. These include, for example, colour metric tasks in the colour, automobile and printing industries, as well as colour rendition techniques. Furthermore, the present invention can also be employed in multispectral image analysis, e.g. of a soil analysis, in environmental protection and in the medical field. Furthermore, the multispectral sensor device according to the present invention can also be used for three-dimensional object recognition by means of colour triangulation. Additional fields of application are sorting systems and devices in which artificial vision has to be employed.

Another field of application is spectrometry, e.g for reaction-kinetic measurements, for determining the speed constants of chemical reactions and for elucidating the reaction mechanisms. Such measurements require a fast sensor that is capable of detecting wavelength selectively a fairly large wavelength range in-situ in a very short time.

Furthermore, the present invention can be used in the paper and printing industry, in which high demands are made on a multispectral sensor device. A fundamental prerequisite for an on-line colour measurement in the paper manufacturing and printing process is that it must take place without any contact and that the material under measurement is difficult to fix due to the web vibrations occurring at the speeds the material attains. There is an additional complication for lighter types of paper due to the problem of translucency, which results in a fluctuation of the measurement results, the cause of which lies in the local constitution of the paper. The multispectral sensor device according to the present invention exhibits all the features needed to perform such measurements in a satisfactory manner.

We claim:

1. Multispectral sensor device comprising:
   a plurality of optoelectrical converters for the recording of spectral regions and for generating a separate electrical measurement signal for each spectral region;
   a processing circuit, in which the electrical measurement signals are each processed to measurement values; and
   a fuzzy logic circuit which, by means of stored association functions, forms from the measurement values output signals from output channels, where to each of the output channels there corresponds a spectral region with a bandwidth which is low compared with the bandwidth of the spectral regions detected by the optoelectrical converter and where the number of output channels exceeds the number of optoelectrical converters.

2. Multispectral sensor device according to claim 1, wherein the optoelectrical converters are photodiodes, pin diodes, Schottky diodes or MOS structures, which are in each case provided with multilayer filters which differ from one another spectrally.

3. Multispectral sensor device according to claim 1, wherein the processing circuit for each measurement channel comprises a measurement amplifier, an analog/digital converter and a measurement value accumulator, via which the individual measurement signals are processed to measurement signal values, and where the measurement signal values are fed to the fuzzy logic circuit via a reference value store in which the reference values are stored.

4. Multispectral sensor device according to claim 1, wherein the plurality of optoelectrical converters and the processing circuit are integrated on a chip as a microsystem.

5. Multispectral sensor device according to claim 1, wherein the fuzzy logic circuit compares the measurement signal values with prescribed spectral colours, which are represented by the reference values, and performs a classification of the colour deviation.

6. Multispectral sensor device according to claim 1, wherein the fuzzy logic circuit performs a spectral analysis concerning the spectral composition and intensity distribution of the optical radiation falling on the multispectral sensor on the basis of the measurement signal values of each measurement channel and from this creates a statement concerning the, occurrence of defined spectral components.

7. Multispectral sensor device according to claim 1, wherein the fuzzy logic circuit is adapted to perform a colour classification of the measurement object.

8. Multispectral sensor device according claim 1, wherein the fuzzy logic circuit is adapted to perform object recognition and classification.

* * * * *